(12) United States Patent
Kimura

(10) Patent No.: US 7,131,712 B2
(45) Date of Patent: Nov. 7, 2006

(54) IMAGE RECORDING APPARATUS

(75) Inventor: Masahiko Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 10/640,709

(22) Filed: Aug. 13, 2003

(65) Prior Publication Data
US 2005/0073541 A1 Apr. 7, 2005

(30) Foreign Application Priority Data
Aug. 14, 2002 (JP) ............................. 2002-236336
Aug. 14, 2002 (JP) ............................. 2002-236337

(51) Int. Cl.
B41J 2/205 (2006.01)
G06K 1/00 (2006.01)
(52) U.S. Cl. ......................................... 347/15; 358/1.9
(58) Field of Classification Search ................. 347/15; 358/1.2, 1.9
See application file for complete search history.

(56) References Cited

U.S. PATENT DOCUMENTS 6,234,606 B1  5/2001  Suzuji
6,250,733 B1* 6/2001 Yao et al. ...................... 347/15
2005/0018222 A1* 1/2005 Yoshida ...................... 358/1.9
2005/0099444 A1* 5/2005 Kakutani ..................... 347/15

FOREIGN PATENT DOCUMENTS

JP    11-320924    11/1999

* cited by examiner

Primary Examiner—Lamson Nguyen
(74) Attorney, Agent, or Firm—Morgan & Finnegan L.L.P.

(57) ABSTRACT

Provided is an ink type image recording apparatus capable of recording high gradation monotone images of high quality at low cost by establishing a certain relationship between a lightness order in a color ink set, which is employed when the image recording apparatus is used as a color image recording apparatus, and a density order in a monotone ink set, which is employed when the image recording apparatus is used as a monochrome image recording apparatus, a control apparatus thereof, and a recording apparatus.

18 Claims, 6 Drawing Sheets

IMAGE RECORDING APPARATUS

BACKGROUND OF THE INVENTION

1. Field of the Invention

The present invention relates to an image recording apparatus and method of controlling the same, and to a recording apparatus.

2. Related Background Art

In recent years, it is desired to provide printer outputs of photographic quality due to the spread of digital cameras, so measures are being taken to ensure that pixels are not conspicuous during color printing, such as using low-density color inks. Consequently, printers capable of printing color images of photographic high quality are widely used.

However, monotone images are still commonly used in fields such as the medical field in which X-ray photographs, CT and MRI images, and the like are used, and in the field of artistic photography.

This is because the human eye has the capacity for high density resolution, and therefore the amount of information capable of being recognized by the human eye is greater in monotone images than in color images.

In addition, it is known that the density resolution capability of the human eye becomes higher when using a transparent recording medium than when using a reflective recording medium. It is said that, in general, although the human eye density resolution with respect to color images is on the order of 8 bits, it is between 10 and 11 bits for monotone transparent images.

Medical images are provided by recording X-ray photographs, and CT and MRI images, on transparent recording media. Diagnosis can be made by a doctor looking at the image at the limit of the density resolution capability of the human eye.

However, recording devices that specialize in high gradation monotone images used mainly in the medical field are extremely expensive.

Photographic quality color image recording apparatuses which are relatively low in cost and capable of recording monotone images also exist, but have a disadvantage in that their gradation expression is inferior compared to that of recording devices that specialize in monotone images.

An example of this type of recording device is one that uses a sublimation thermal transfer method. This is a method in which three types of ink ribbons (dyes) in the colors Y, M, and C, or the colors R, G, and B, are prepared, and in a state where the ink ribbons overlap with a recording medium, partial heating thereof is conducted by using a thermal head. Then, the dyes in the ink ribbons are transferred to the medium, thus forming an image. A color image can be formed by repeating the same process three times for the three types of ink ribbons. The three types of ink may all be overlapped uniformly in order to record monotone images with this method.

However, since the monotone images are expressed by overlapping the three types of colors with this method, it is difficult to express neutral monochrome images having no color tints. Further, image with sufficient monochrome density (for example, OD3) cannot be expressed particularly on a transparent medium.

Another method is an ink jet method. In this case, three types of ink, in the colors Y, M, and C, or the colors R, G, and B, are prepared, and a color image can be expressed by overlapping the three colors. In this case as well, monotone images can be expressed by uniformly overlapping the three colors. However, with this method too, it is difficult to express neutral monotone images without color tints, similar to the sublimation thermal image transfer method, because the three colors are overlapped. Further, the inks must be overlapped in the same pixels in order to express sufficient monochrome density (for example, OD3) particularly on a transparent medium. However, there is a limit to the amount of ink that can be absorbed by the medium, and image with a sufficient monotone density cannot be expressed. That is, the inks are applied to identical pixels and overlapped in order to generate gradations in an image or in order to increase the density, but there is a limit to the amount of ink that can be absorbed by the recording medium. If the inks are overlapped to such an extent that this limit is exceeded, then the inks will overflow and the image will become blurry.

It is difficult to express monotone images with both of the methods described above because color inks are used, resulting in development of a slight color tint.

In addition, low density portions develop a rough image quality in which dither is noticeable.

SUMMARY OF THE INVENTION

The present invention had been made in view of the above-mentioned circumstances. Therefore, it is an object of the present invention to provide an image recording apparatus capable of recording a high gradation monotone image of high quality at low cost, a control apparatus thereof, and a recording apparatus.

According to the present invention, the foregoing object is attained by providing an image recording apparatus including: a recording nozzle group capable of discharging three or more types of ink; a driving means for moving the recording nozzle group relatively with respect to a recording medium; an image brightness signal inputting means for inputting three or more types of image brightness signals; and a recording and controlling means for recording an image onto the recording medium by causing the three or more types of monochrome ink to be discharged from the recording nozzle group based on the image brightness signals that are input by the image brightness signal input means.

Further, the foregoing object is also attained by providing an image recording apparatus including: a recording nozzle group capable of discharging three or more types of ink; a driving means for moving the recording nozzle group relatively with respect to a recording medium; an image brightness signal inputting means for inputting input image information as three or more types of image brightness signals; a ink type distribution process means for sorting the image brightness signals, which are input by the image brightness signal inputting means, into image density signals that correspond to each of the inks; and a recording and controlling means for recording an image onto the recording medium by causing the three or more types of ink to be discharged from the recording nozzle group based on the image density signals for each ink which are sorted by the ink type distribution process means; in which the three or more types of ink have a certain relationship between a lightness organization for each color ink in a color ink set when the recording apparatus is used as a color printer, and a density organization for each monotone ink of a monotone ink set when the recording apparatus is used as a monotone printer.

Still further, the foregoing object is also attained by providing a recording apparatus that records a monotone image by using a recording engine of a color image recording apparatus and discharging a plurality of monotone inks having different densities, the recording engine of the color image recording apparatus being provided with a recording nozzle group capable of discharging at least three of more types of ink to record a color image by moving the recording nozzle group relatively with respect to a recording medium and discharging color inks onto the recording medium, in which a density order of the monotone inks is made to be the same as a lightness order of the color inks.

Other objects, features and advantages of the present invention will be apparent from the following descriptions taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will be described in detail in accordance with the accompanying drawings.

First Embodiment

An embodiment of the present invention is explained in detail below with reference to the appended drawings.

<Mechanical Structure>

Figure 1:
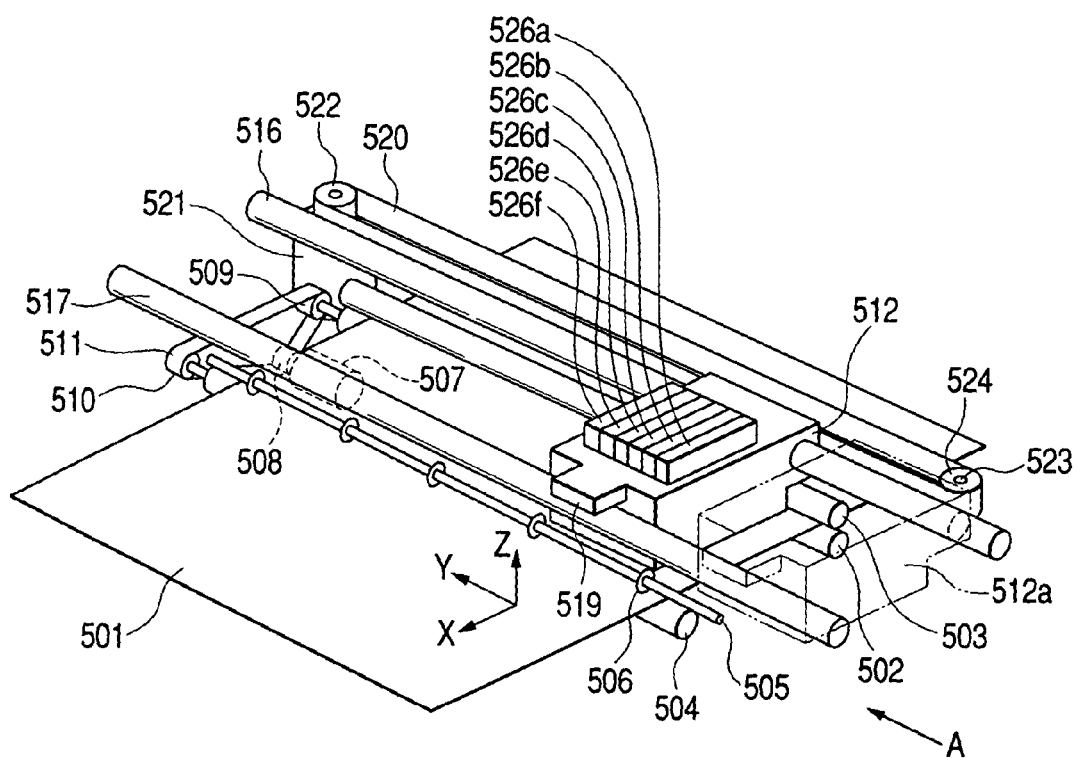
FIG. 1 is a perspective view showing a main portion of an ink jet recording apparatus of an embodiment of the present invention.
Figure 2:
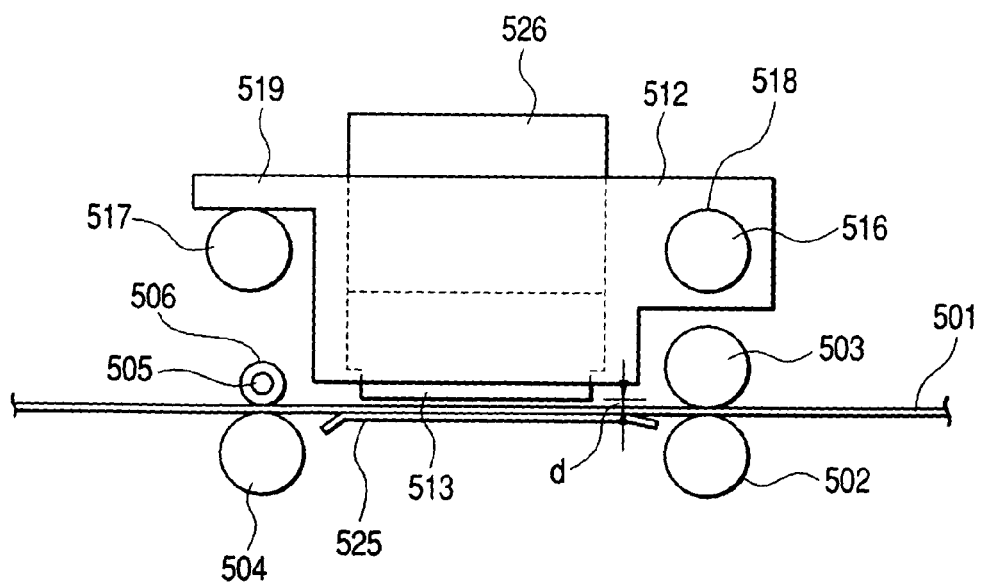
FIG. 2 is a side view of FIG. 1 viewed from an arrow A direction.
Figure 3:
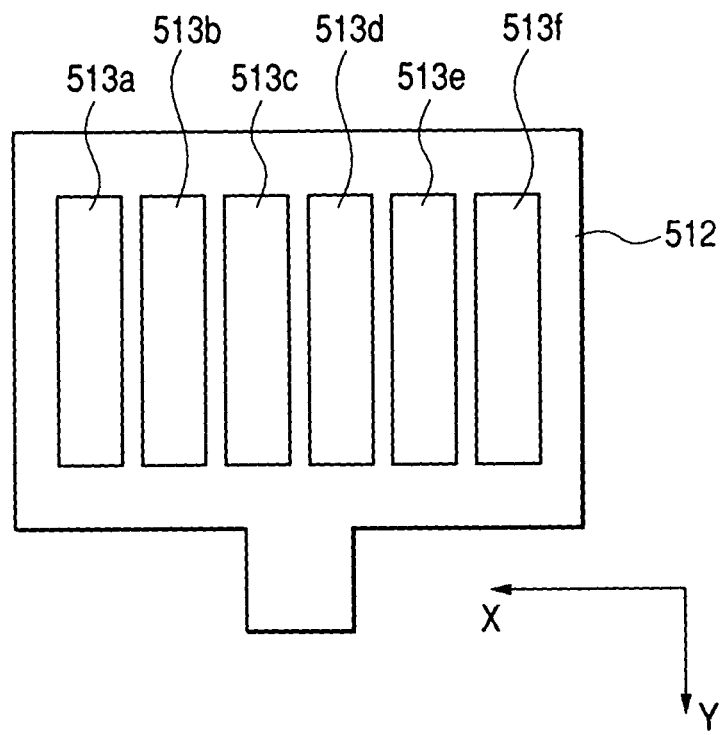
FIG. 3 is a detailed diagram of portions of FIG. 1.

FIG. 1 is a perspective view showing a main portion of an ink jet recording apparatus of this embodiment according to the present invention. FIG. 2 is a side view of FIG. 1 viewed from an arrow A direction, and FIG. 3, FIG. 4A, and FIG. 4B respectively show a detailed diagram of a recording head portion of FIG. 1.

In FIG. 1 and FIG. 2, Reference numeral 501 denotes a sheet on which an image is recorded, and reference numerals 502 and 503, and 504 and 505, denote pairs of rollers for transporting the sheet in an X-direction. The roller 505 is provided with plural expanded diameter portions 506 spaced apart at a predetermined interval in a longitudinal direction, and the expanded diameter portions 506 contact the sheet. Reference numeral 507 denotes a motor, reference numeral 508 denotes a pulley that is attached to a motor axle, and reference numerals 509 and 510 denote pulleys that are attached to one end of the rollers 502 and 504, respectively. The rollers 502 and 504 are coupled with the pulley 508 by a belt 511, and rotate in accordance with the rotation of the motor 507. Further, each of the rollers 503 and 505 is urged in a pressurizing direction of the rollers 502 and 504 by an urging means that is not shown. The sheet is sandwiched between each of the rollers, and is transported in the X-direction.

Figure 4A:
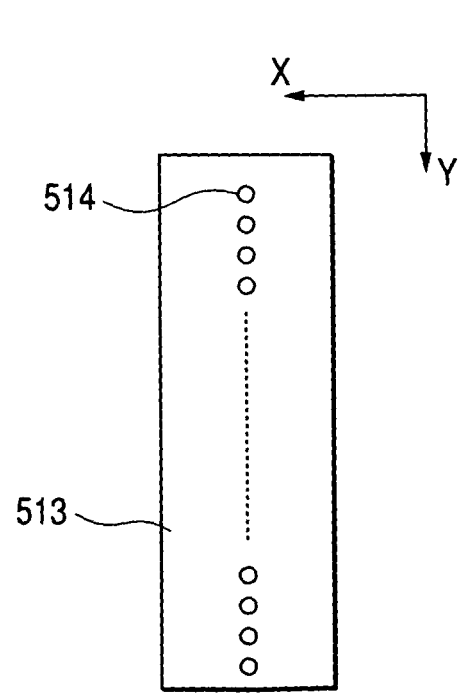
FIG. 4A is a detailed diagram of portions of FIG. 1.
Figure 4B:
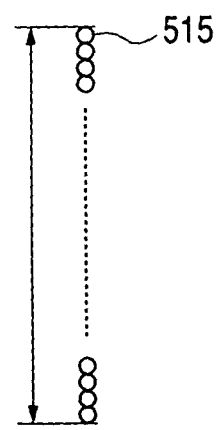
FIG. 4B is a detailed diagram of portions of FIG. 1.

Reference numeral 512 denotes a carriage on which a plurality of heads 513a to 513f are mounted. As shown in FIG. 4A, a plurality of nozzles are provided in each of the heads in locations that oppose the sheet surface. Reference numerals 516 and 517 denote shafts that slidably support the carriage. The shaft 516 passes through a hole 518 formed in the carriage. Further, a protruding portion 519 that extends out, from the carriage 512 comes in contact with the shaft 517 from thereabove.

A surface of the head 513 on which the nozzles are provided is disposed opposing the sheet at a predetermined gap d in accordance with the aforementioned structure. Reference numeral 520 denotes a belt, and a portion thereof is fixed to the carriage 512. The belt joins together a pulley 522 that is attached to a drive axle of a motor 521, and a pulley 524 that is rotatably attached to a fixed axle 523.

In accordance with the aforementioned structure, reciprocating motion of the carriage becomes possible along a Y-direction by rotating the motor 521. Motion of the carriage also becomes possible over the entire Y-direction range of the sheet, and between a carriage holding position 512a and a position that is symmetrical with the holding position 512a. Note that the gap d between the nozzle surface and the sheet is fixed while the carriage is moved over the sheet. Reference numerals 526a to 526f denote ink cartridges filled with ink. The ink cartridges are attached onto the heads 513a to 513f, respectively, and supply ink to the heads. A head cartridge 526 is detachably attachable to the head 513. Ink can be replenished if the ink in the ink cartridge runs out by detaching the head cartridge 526 and attaching a new ink cartridge.

Six types of ink cartridges are prepared in this embodiment. For a color printer in which the cartridges are employed, the color inks in the ink cartridges are as follows in the stated order from the ink cartridge 526a: yellow ink; magenta ink; cyan ink; light magenta ink; light cyan ink; and black ink. In this embodiment, the lightness of respective inks are set to 95, 52, 62, 12, 90, and 92, in the stated order. Six types of monotone inks employed in this embodiment have a density of 100%, 50%, 25%, 13%, 6%, and 3%, respectively. These monotone inks having different densities are lined up in order from the low lightness color ink side.

The order of ink arrangement in this embodiment is as shown in Table 1.

TABLE 1

| Ink cartridge | Color ink | Color ink lightness | Lightness Order | Monotone ink density | Density Order |
| --- | --- | --- | --- | --- | --- |
| 526a | Yellow | 95 | 1 | 3% | 1 |
| 526b | Magenta | 52 | 5 | 50% | 5 |
| 526c | Cyan | 62 | 4 | 25% | 4 |
| 526d | Light Magenta | 90 | 3 | 13% | 3 |
| 526e | Light Cyan | 92 | 2 | 6% | 2 |
| 526f | Black | 12 | 6 | 100% | 6 |

TABLE 2

| | |
|---|---|
| 526a | 5% |
| 526b | 48% |
| 526c | 38% |
| 526d | 9% |
| 526e | 8% |
| 526f | 88% |

Further, it is possible to change the color tones to a sepia tone or the like while maintaining a quality of high gradation by changing the tone of the ink set depending on the application.

For example, the ink cartridge 526f may have black ink, and the ink cartridges 526a to 526e may have gray inks that have different densities such that they follow the ratios of Table 2, in an ink set for a neutral monochrome image.

Reference numeral 525 denotes a sheet guide that is provided between the rollers 502 and 504. A suction acts upon a sheet by a suction means (not shown), in a direction toward the bottom of FIG. 2, in accordance with air from plural small holes formed in a surface that is brought into contact with the sheet. The sheet adheres to the sheet guide due to this suction force, thereby preventing sheet from being floated. The gap d naturally cannot be maintained if the sheet floats, and further, there are also cases in which the sheet may come in contact with the head. Reference numeral 515 denotes dots formed on the sheet when ink is discharged on the sheet from the nozzles.

Note that in this embodiment, the carriage is structured by using separate heads for each color. However, the structure may be such that heads for a plurality of colors or densities are integrally formed and the one head may be have a plurality of nozzle groups, and densities may be allocated to each of the nozzle groups.

<Electric Circuit Structure>

Figure 5:
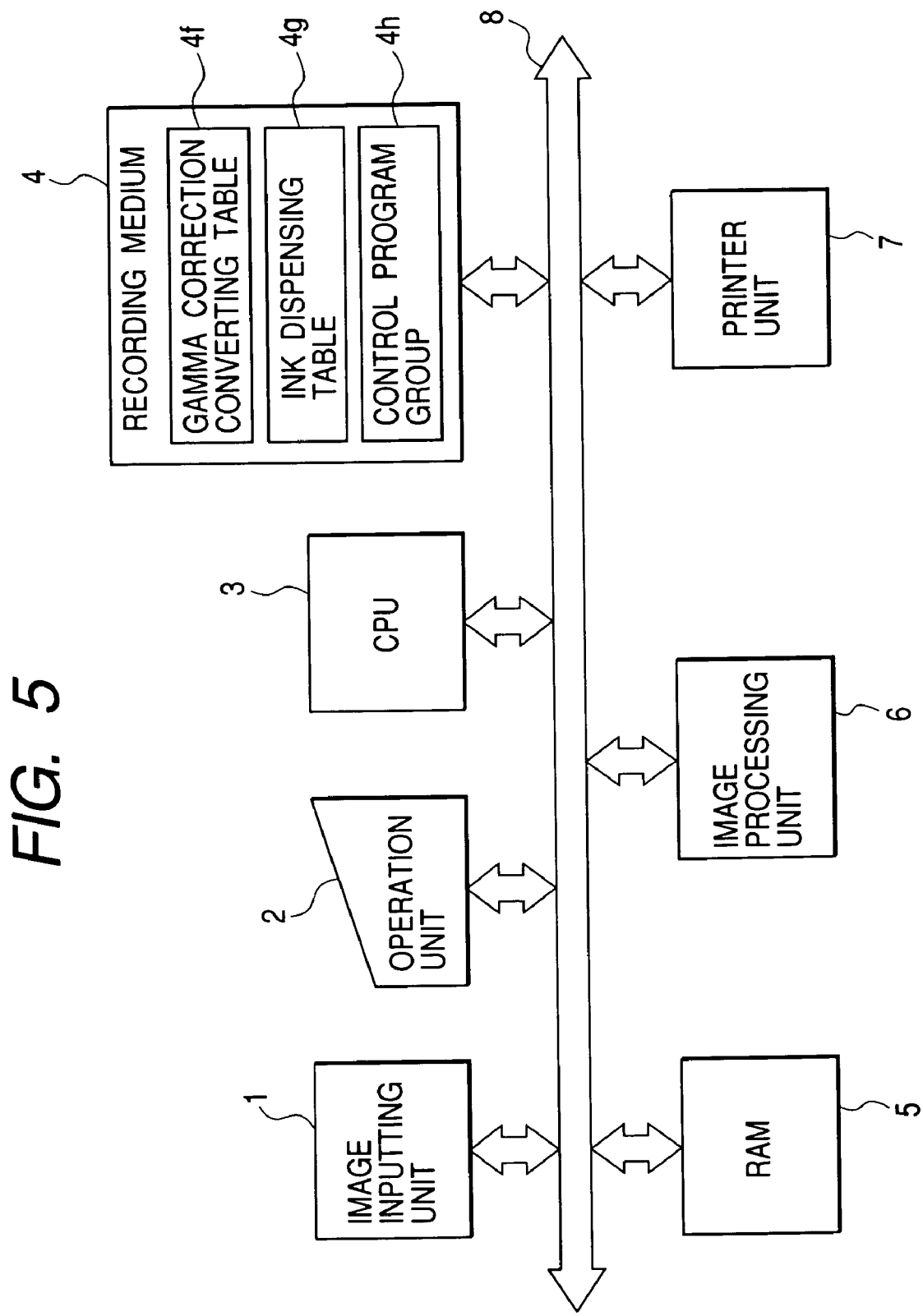
FIG. 5 is a control block diagram of an ink jet recording apparatus of an embodiment of the present invention.
Figure 8:
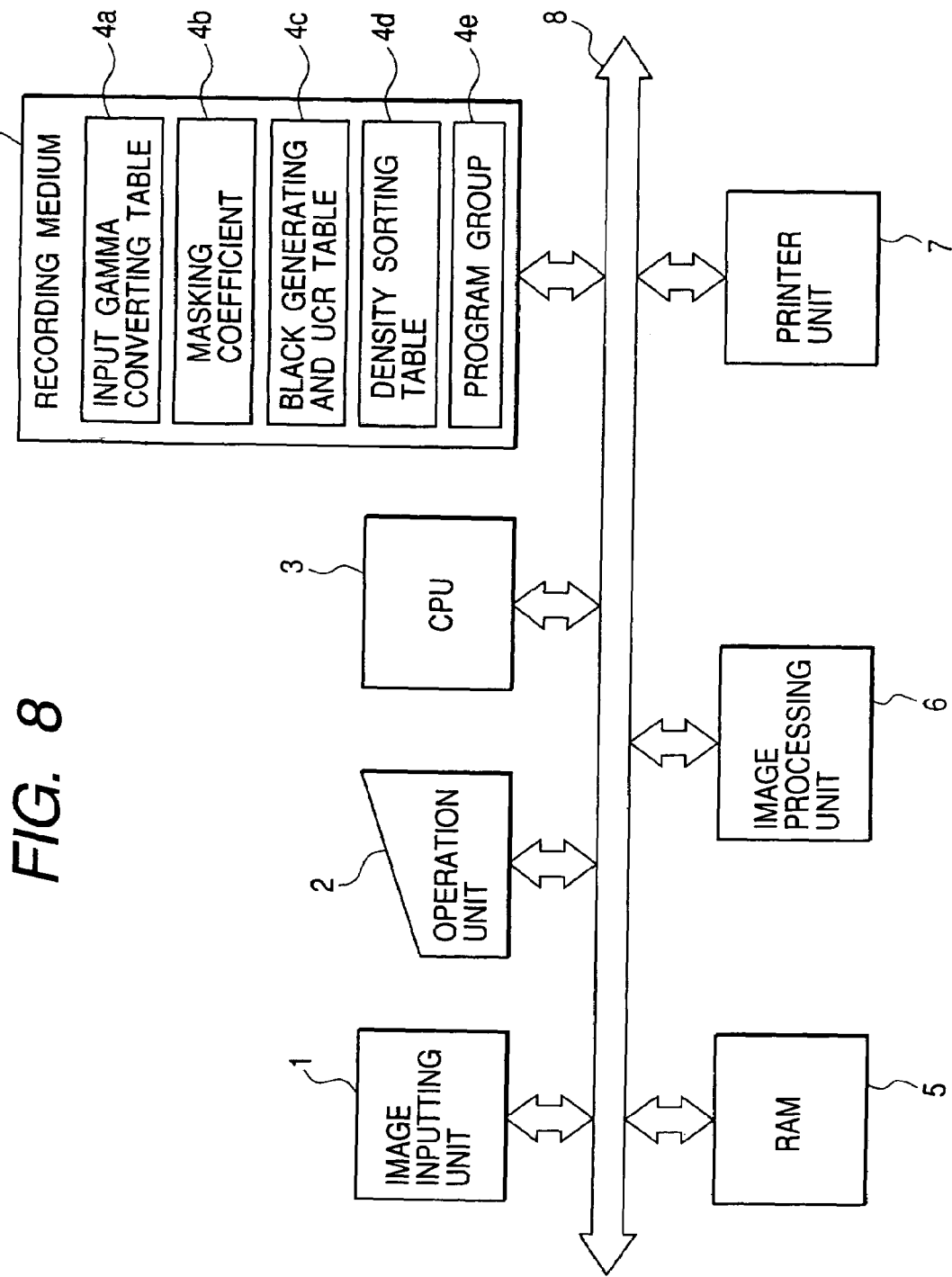
FIG. 8 is a block diagram of a color image processing unit.

FIG. 5 and FIG. 8 are block diagrams of control circuits that manage various types of control for the ink jet recording apparatus in this embodiment.

As shown in FIG. 5, reference numeral 1 denotes an image inputting unit such as a scanner to which image data is input through an external apparatus or a network.

The input image data is resolved as a color image into three colors: yellow, magenta, and cyan; or red, green, and blue. Density data is obtained for each of the colors for each pixel. In addition, a modality such as CT or MR is also contained in the inputting unit.

Reference numeral 2 denotes an operation unit provided with keys that indicate parameter settings and the start of printing. Reference numeral 3 denotes a CPU for controlling the overall recording apparatus in accordance with programs within a recording medium.

Reference numeral 4 denotes a recording medium that stores programs and the like for operating the recording apparatus in accordance with control programs and error processing programs. All the operations in this embodiment are performed in accordance with these programs. A ROM, a floppy disk, a CD-ROM, a hard disk, a memory card, a magneto-optical disk, or the like can be sued as the recording medium 4 that stores the programs.

Reference numeral 5 denotes a RAM used as a working area for each of the programs within the recording medium 4, as a temporary storage area during error processing, and as a working area during image processing. Further, the RAM 5 is also capable of changing the contents of tables within the recording medium 4 after copying the tables, and proceeding with image processing while referring to the changed tables.

Reference numeral 6 denotes an image processing unit that forms discharge patterns based on the input image by using an ink jet in order to achieve high gradations in an ink jet printer.

Reference numeral 7 denotes a printer that forms dot images based on the discharge patterns made by the image processing unit, and contains the recording unit shown in FIG. 1. Reference numeral 8 denotes a bus line for transmitting address signals, data, control signals, and the like within the apparatus.

<Image Processing Unit>

The image processing unit 6 is explained next with reference to FIG. 8.

If the input image is a color image, processing may be the same as image processing for color printing when using a general-purpose ink jet color printer.

An algorithm for recording the color image may be the one disclosed in Japanese Patent Application Laid-Open No. 6-226998, for example.

Reference numeral 4a in the recording medium 4 of FIG. 8 denotes an input gamma converting table to be referred to during processing by an input-output gamma conversion circuit that is discussed later. Reference numeral 4b denotes a masking coefficient that is to be referred to during processing by a color correcting (masking) circuit that is discussed later. Reference numeral 4c denotes a black generating and UCR table that is to be referred to during black generation and during processing by a UCR circuit, which are discussed later. Reference numeral 4d denotes a density sorting (ink type distribution processing) table that is to be referred to during processing by a density sorting (ink type distribution processing) circuit that is discussed later. Reference numeral 4e denotes a program group that stores various programs discussed above. These elements are used for image processing of color input.

Figure 7:
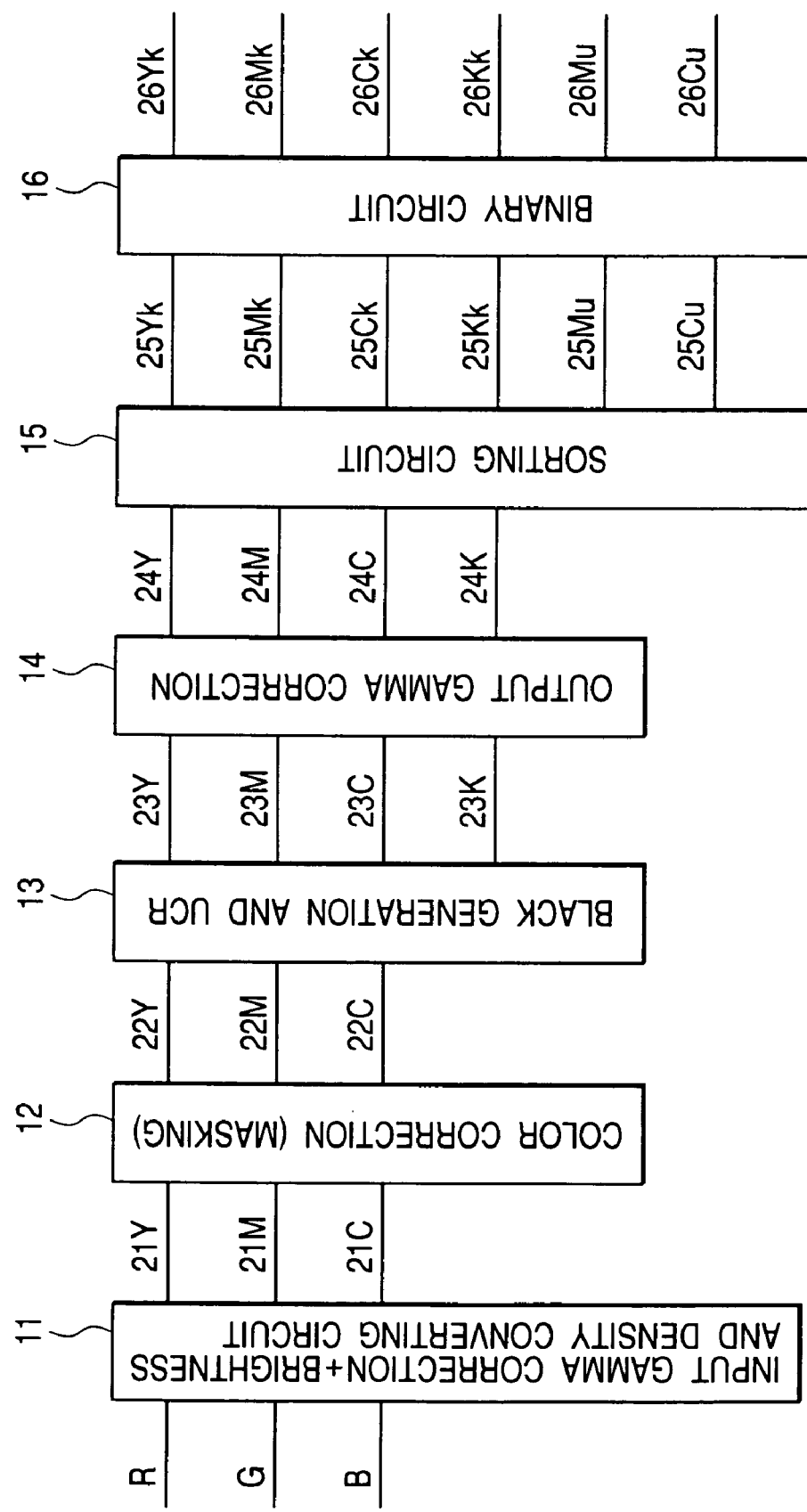
FIG. 7 is a block diagram showing an example of an image signal processing circuit, which is shown in FIG. 8.

FIG. 7 is a block diagram that shows examples of circuits for structuring the image signal processing unit 6 of this embodiment.

Image brightness signals R, G, and B that correspond to red, green, and blue, respectively, are transmitted from a host apparatus or the like. The image brightness signals are input into an input gamma correction+brightness and density converting circuit 11, where they are converted into image density signals 21Y, 21M, and 21C that correspond to yellow, magenta, and cyan, respectively. Color processing is performed on the signals by a color correction (masking) circuit 12 and a black generation and UCR (under color removal) circuit 13. The signals are thus converted into new image density signals 23Y, 23M, 23C, and 23K.

Then, the image density signals undergo gamma correction by an output gamma correction circuit 14.

An output gamma correction value at this point differs from that used when employing color ink. Deviation between color ink lightness ratio and monotone ink density ratio is corrected here. The gamma correction value is adjusted in advance so that test outputs such as gray scales become linear.

After the gamma correction, the signals are sorted by density sorting (ink type distribution processing) circuit 15 into image density signals 25Yk, 25Mk, 25Ck, 25Kk, which correspond to yellow, magenta, cyan, and black, respectively, and image density signals 25Mu and 25Cu, which correspond to low color density light cyan and light magenta, respectively.

Each of the image density signals 25Yk, 25Mk, 25Ck, 25Mu, 25Cu, and 25Kk is then binarized by a binary circuit 16. The binary data is taken as recording head discharge signals in a printer unit 7, and ink is discharged from each of the recording heads by monotone ink discharge ports in accordance with the signal values. A monotone image is thus recorded.

On the other hand, the input image is generally a monochrome image for cases where the inputting unit has a modality such as CT or MR. Recording is performed by an algorithm described below if the input image is a monochrome image. The algorithm differs from the color printer algorithm described above.

Reference numeral 4f in the recording medium 4 of FIG. 5 denotes a gamma correction converting table to be referred to during gamma correction processing, reference numeral 4g denotes an ink dispensing table (ink combining table) used for referring on the ink sorting process described below, and reference numeral 4h denotes a program group that stores various programs. These elements are used in image processing of monochrome input.

Figure 6:
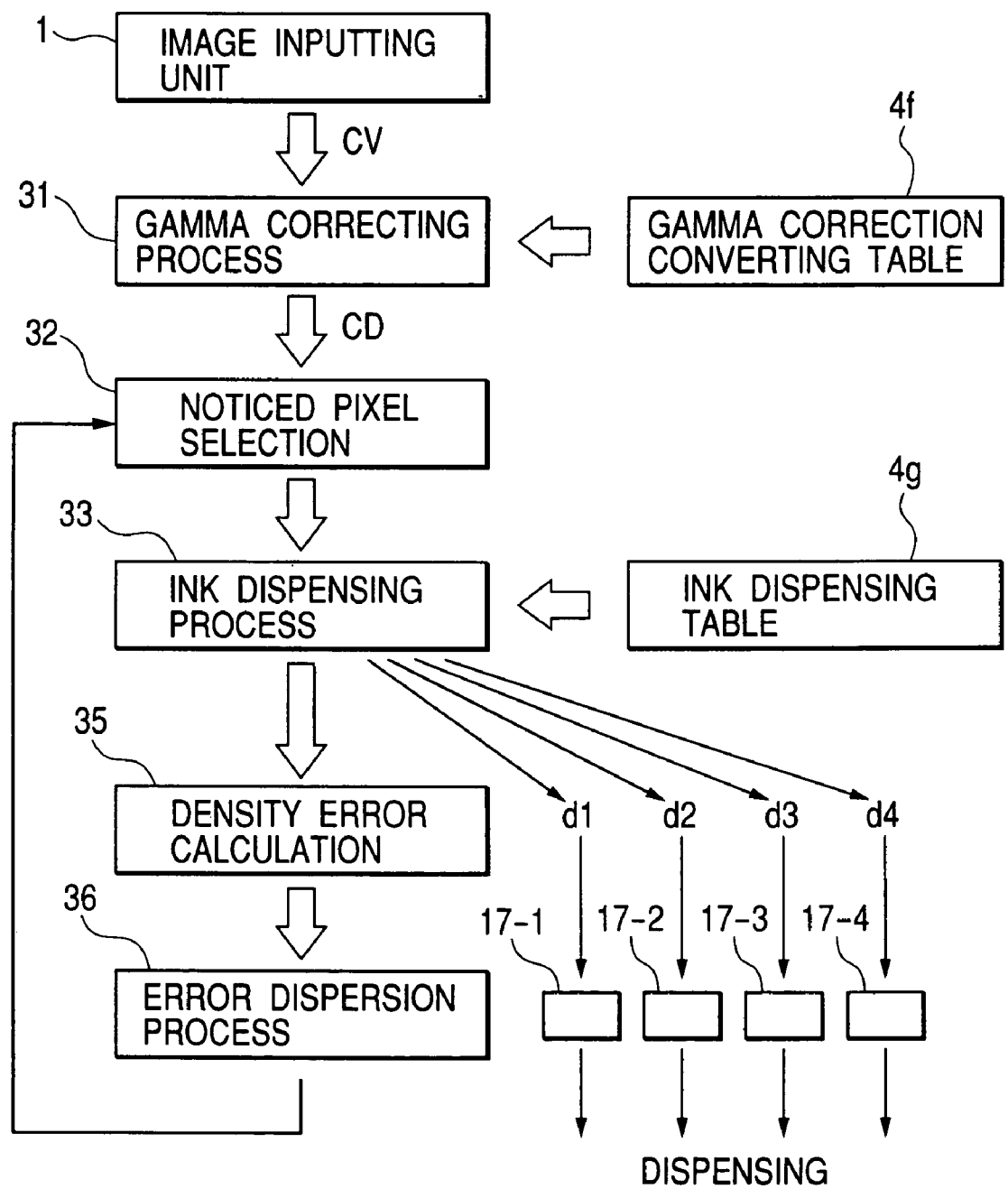
FIG. 6 is a block diagram of a monotone image processing unit.

The monochrome image processing unit 6 is explained with reference to FIG. 6.

In a gamma correcting process 31, an image signal CV input from the image inputting unit 1 is converted into a signal CD that expresses densities of monotone images by using the stored gamma correction converting table 4f, and the signal CD is stored in a page memory region of the image processing work area of the RAM 5.

In a noticed pixel selection 32, one pixel within the page memory region that is to undergo processing is selected, and the density data CD is obtained.

Then, in an ink dispensing process, an ink combination with which a density close to the density CD of the noticed pixel is expressed is selected with reference to the ink dispensing table 4g based on the CD value of the noticed pixel. The difference between the density capable of being expressed by the ink combination selected in the ink dispensing process 33 and the CD value of the noticed pixel is computed by a density error calculation 35. Binary signals d1, d2, d3, and the like for discharge or non-discharge by the heads corresponding to each density are also determined based on this combination.

In an error dispersion process 36, the difference is distributed by a given method to peripheral pixels that have not yet undergone the ink type dispensing process 33, and added to or subtracted from the CD value of the noticed pixel.

Processing of the noticed pixel is thus completed by the processes described above.

Recording of photographic high quality monotone images that cannot be expressed by a normal color printer can thus be performed.

In FIG. 2, upon recording the sheet 501 which is at the left of the figure is sent between the rollers 502 and 503 by a means that is not shown. The sheet is sent intermittently in the X-direction at a predetermined distance by the motor 507. The motor 521 rotates while the sheet is stopped, and the carriage is moved at a fixed speed in the Y-direction. While the heads on the carriage are passing over the sheet, a nozzle discharge command signal corresponding to the image signal is sent by the control circuit of FIG. 5 and FIG. 6, and in accordance therewith, the heads on the carriage selectively discharge liquid droplets from each of the nozzles. The motor 507 moves the sheet by a predetermined distance in the X-direction and stops the sheet while the heads pass over the sheet to be located at a position not opposed to the sheet surface. The motor 507 once again moves the sheet at a predetermined speed, and the liquid droplets are selectively discharged in the similar manner. A desired image is thus recorded on the sheet by repeating this process. The sheet is sent in the left-hand direction of FIG. 2 by the rollers 504 and 506 after the recording is completed, and is then delivered in the left-hand direction of FIG. 2 by a transporting means that is not shown.

Algorithms for high gradation recording that use three or more types of black tone inks as described above are disclosed in Japanese Patent Application No. 9-78423 and Japanese Patent Application Laid-Open No. 11-320924, for example.

The recording algorithm may thus be changed in accordance with the input image to perform recording.

In accordance with the present invention, by making the density organization order of a monotone ink set conform to the lightness organization order of color inks, it becomes possible to output monochrome images while utilizing a color printing algorithm as it is for image processing.

Further, since the density organization of the monotone ink set is in proportion to the color ink lightness organization, it becomes possible to provide an image recording apparatus capable of recording a high gradation monotone image of high quality, and a control apparatus thereof, and a recording apparatus.

This means that printing technology such as image processing LSIs of general-purpose photographic image quality color printers can be utilized as it is. The general-purpose photographic image quality color printer can be utilized as a monochrome image recording apparatus of low cost and high operation, and thus it becomes possible to provide low cost medical reference image printers. On the other hand, for cases in which high gradation output such as a very high quality monochrome image, in particular a medical diagnostic image, is necessary, it becomes possible to output a very high quality monochrome image by taking measures such as selection of printer drivers and the like, or an automatic selection corresponding to printing requests from a DICOM to implement image processing specialized for monochrome images on an input image. Accordingly, it becomes possible to provide a monochrome printer capable of handling images for both reference use and diagnostic use.

Further, by switching the ink set, it becomes possible to increase the usage versatility i.e., to appropriately obtain an image of high gradation monochrome quality, high gradation sepia monotone quality, or color photographic quality depending on the usage.

The present invention is not limited to the above embodiments and various changes and modifications can be made within the spirit and scope of the present invention. Therefore to apprise the public of the scope of the present invention, the following claims are made.

What is claimed is:

1. An image recording apparatus comprising:
a recording nozzle group capable of discharging three or more types of ink;
a driving means for moving the recording nozzle group relatively with respect to a recording medium;
an image brightness signal inputting means for inputting input image information as three or more types of image brightness signals;
a ink type distribution process means for sorting the image brightness signals, which are input by the image brightness signal inputting means, into image density signals that correspond to each of the inks; and a recording and controlling means for recording an image onto the recording medium by causing the three or more types of ink to be discharged from the recording nozzle group based on the image density signals for each ink which are sorted by the ink type distribution process means;

wherein the three or more types of ink have a certain relationship between a lightness organization for each color ink in a color ink set when the recording apparatus is used as a color printer, and a density organization for each monotone ink of a monotone ink set when the recording apparatus is used as a monotone printer.

2. The apparatus according to claim 1, wherein the density of each monotone ink of the monotone ink set is placed in a decreasing order so that the lightness of each color ink of the color ink set is placed in an increasing order.

3. The apparatus according to claim 2, wherein the ink set is configured to be detachably attachable as an ink cartridge filled with ink.

4. The apparatus according to claim 2, wherein the image recording apparatus is used in recording medical images.

5. The apparatus according to claim 1, wherein the density organization of the monotone ink set is proportional to the lightness organization of the color ink set.

6. The apparatus according to claim 5, wherein the ink set is configured to be detachably attachable as an ink cartridge filled with ink.

7. The apparatus according to claim 5, wherein the image recording apparatus is used in recording medical images.

8. The apparatus according to claim 1, wherein the three or more types of ink have a certain relationship between a lightness ratio of each color ink in the ink set when the image recording apparatus is used as a color printer, and a density ratio of each monotone ink of the monotone ink set when the image recording apparatus is used as a monotone printer.

9. The apparatus according to claim 8, wherein the ink set is configured to be detachably attachable as an ink cartridge filled with ink.

10. The apparatus according to claim 8, wherein the image recording apparatus is used in recording medical images.

11. The apparatus according to claim 1, wherein the ink type distribution process means performs sorting of the image density signals corresponding to each of the inks of the color ink set for cases in which the image recording apparatus is used as a color printer when the input image is a color image.

12. The apparatus according to claim 11, wherein the ink set is configured to be detachably attachable as an ink cartridge filled with ink.

13. The apparatus according to claim 11, wherein the image recording apparatus is used in recording medical images.

14. The apparatus according to claim 1, wherein the ink type distribution process means performs:

in the case of the input image is a color image, sorting of the image density signals corresponding to each of the inks of the color ink set for cases in which the image recording apparatus is used as a color printer; and in the case of the input image is a monochrome image, sorting of the image density signals corresponding to each of the inks of the monotone ink set for cases in which the image recording apparatus is used as a monochrome printer.

15. The apparatus according to claim 14, wherein the ink set is configured to be detachably attachable as an ink cartridge filled with ink.

16. The apparatus according to claim 14, wherein the image recording apparatus is used in recording medical images.

17. The apparatus according to claim 1, wherein the ink set is configured to be detachably attachable as an ink cartridge filled with ink.

18. The apparatus according to claim 1, wherein the image recording apparatus is used in recording medical images.

* * * * *